United States Patent

Aleiner

[11] Patent Number: 6,038,460
[45] Date of Patent: Mar. 14, 2000

[54] RECEIVER FOR AN RF SIGNAL BOOSTER IN WIRELESS COMMUNICATION SYSTEM

[75] Inventor: Boris Aleiner, Somerset, N.J.

[73] Assignee: Lucent Technologies Inc.

[21] Appl. No.: 08/878,268

[22] Filed: Jun. 18, 1997

[51] Int. Cl.[7] ................................................ H04Q 7/32
[52] U.S. Cl. ...................... 455/571; 455/88; 455/341; 455/251.1
[58] Field of Search ................................ 455/341, 7, 571, 455/127, 88, 232.1, 241.1, 245.1, 250.1, 251.1, 234.1, 245.2; 330/149

[56] References Cited

U.S. PATENT DOCUMENTS

| | | | |
|---|---|---|---|
| 4,055,809 | 10/1977 | Takeuchi et al. | 455/6.1 |
| 5,095,541 | 3/1992 | Aisaka et al. | 455/571 |
| 5,291,147 | 3/1994 | Muurinen | 330/136 |
| 5,551,067 | 8/1996 | Hulkko et al. | 455/88 |
| 5,589,797 | 12/1996 | Gans et al. | 330/149 |
| 5,722,063 | 2/1998 | Peterzell et al. | 455/287 |
| 5,754,943 | 5/1998 | Arai et al. | 455/14 |
| 5,812,094 | 9/1998 | Maldonado | 343/702 |

Primary Examiner—Dwayne D. Bost
Assistant Examiner—Alan Gantt

[57] ABSTRACT

In a wireless communications system, an RF booster provided intermediate an antenna device for receiving RF signals and a receiver device for providing a predetermined amount of gain to said received RF signals and converting said RF signals to audio frequency signals, the RF booster comprising a first amplifier device for receiving input signals from the antenna via a first cable connecting device, the first low noise amplifier providing a first gain equal to the predetermined amount of gain of the receiver device; a second amplifier device connected in series with the first amplifier device, the second amplifier device connected via a second cable connecting device to the receiver device and providing a second amount of gain of a value sufficient to compensate for signal loss provided by the first and second cable means; and a switch element capable of switching out the first gain of the first amplifier device, the switch element controlled by a control signal in accordance with a sensed level of received input RF signals, wherein for small input RF signals received, the switch element is switched off to provide both the first and second gain in the RF booster, and for large input signals received, the switch element is switched on to provide only the second gain for the RF booster.

7 Claims, 2 Drawing Sheets

RECEIVER FOR AN RF SIGNAL BOOSTER IN WIRELESS COMMUNICATION SYSTEM

FIELD OF THE INVENTION

The present invention relates generally to RF wireless communications and particularly, to an RF booster stage having a variable gain, variable linearity low noise amplifier.

BACKGROUND OF THE INVENTION

Since the 1970's, wireless communication systems have seen increased popularity and are now commonplace in both commercial and personal aspects. For example, satellite links, cellular and mobile telephone systems (operating in the 846–891 MHZ frequency range), and more recently, Personal Communication Systems (operating in the 1.91–1.99 GHz frequency range), and many other useful, convenient, and low cost devices have been developed.

One such type of cellular communications system employs a "Personal Station" which is a telephone apparatus for use in a moving vehicle, e.g., an automobile. FIG. 1 illustrates a combination of a "Personal Station"/RF Booster system 10 with the "Personal Station" 12 comprising a vehicular cellular telephone, that may include, for example, a handset (not shown) capable of being placed in a holder of a vehicle's "Hands-Free" Personal Communications Kit to enable a driver (or passenger) to utilize full cellular phone services, i.e., receive and transmit, without the need to hold the phone while the vehicle is in motion. Typically, as shown in FIG. 2, the front end of the receiver device 75 of the Personal Station, is most likely provided with a fixed or variable gain low noise amplifier 65, with sufficient power handling capability to warrant Industry Standards classification of Personal Stations as Class II devices. As all Personal Stations adhere to this Industry standard, each receiver will include such a low noise amplifier. Typically, the gain of such an amplifier ranges from 13–18 dB, and, as shown in the example front end receiver 75 in FIG. 2, may be switched in and out by the provision of switch 72 connected in parallel with the low noise amplifier 65. For instance, when the received input signals are small, the front end receiver 75 switches the low noise amplifier 65 on, for example, by logic control signal 67 which controls the opening of switch 72. Logic control signal 67 is part of a sensor feedback system (not shown) that senses the amplitude of received input signals. The gain of the front end receiver 75 with the low noise amplifier 65 switched on, in this case may be, e.g., 13.5 dB. As a consequence, any noise present at the input is suppressed, and consequently, sensitivity is improved. When the value of the input signal is high enough to overload the mixer, the low noise amplifier 65 is switched off by logic control signal 67 which controls the closing of switch 72. At the time the low noise amplifier is switched out, the gain of the front end becomes –6.5 dB and front end overloading is prevented. The sensitivity in this case is not impaired since the value of signals is high enough to be reliably distinguished from the noise level.

It should be understood that the types of signals contemplated to be processed in such wireless systems include TDMA (time division multiple access) signals and CDMA (code division multiple access) signals. The sensitivity of the Personal Stations receiving these signals is about –110 dBm for TDMA and –104 dBm for CDMA.

As shown in FIG. 1, the Personal Station 12 is coupled to the RF booster 25 via an antenna coupler 15 and coaxial connection cable 20. The RF booster 25, in turn, is connected by a short coaxial cable 48 to the roof antenna 50 of a vehicle such as an automobile. The RF booster 25 typically comprises a transmit duplexer 30a and 30b for coupling signals from the output of Personal Station 12 to a transmitter power amplifier 45 for outputting high power signals through the vehicle's roof antenna 50. On the receiving side, the duplexer 30a and 30b couples input RF signals received from the vehicle antenna to a low noise amplifier 40 and, in turn, to the receiver end of the Personal Station 12. Typically, the RF Booster's low noise amplifier 40 is also a fixed gain device of constant linearity and amplification in the personal station is usually done by increasing the transmitted power of the combination "Booster—Personal Station" as compared to the transmitted power of the Personal Station itself.

Normally, the goal of the RF booster's design is to enhance operation of the Personal Station, typically a Class II unit, into a higher class, e.g., a Class I combination. It is a straightforward task to convert the combination "Booster—Personal Station" to the Class I unit on the transmission side, e.g., by increasing the transmitted power of the RF booster's power amplifier 45. However, it is not so easy to meet Class I requirements of this combination on the receiving side because of the difficulty in meeting sensitivity and linearity requirements simultaneously.

One solution would be to simply provide the low noise amplifier such as contained in the typical receiver of a personal station, to the RF Booster's front end. However, this solution will not meet the sensitivity requirements for Class I Personal Stations.

As it is recognized that an RF booster includes a combination of lossy and noisy connecting cables, e.g., coax cables 20 and 48 as shown in FIG. 1, a Low Noise Amplifier may be provided in the booster to compensate for the cable loss. However, it is the case that if an overall gain of the RF booster is 0 dB, the cables generate enough noise for overall sensitivity to fail the specifications. A traditional method to improve the sensitivity is to increase the gain in the front end. However, if the booster's gain is increased even for the smallest input signals, the power of interfering signals, will be amplified as well resulting in overload of the receiver's low noise amplifier.

It would thus be highly desirable to provide a variable gain and linearity low noise amplifier device for use in wireless communication systems, such as the Personal Station.

Moreover, it would be highly desirable to provide a variable gain and linearity low noise amplifier that would enable receipt of signals from more remote geographical locations, i.e., thus increasing effective range of personal and mobile cellular communication systems with improved sound quality.

SUMMARY OF THE INVENTION

The instant invention is a design for a low noise amplifier for an RF booster that is capable of providing variable gain to signals for a receiver provided in a wireless communications system, e.g., a Personal Station provided in an automobile. Additionally, the low noise amplifier for the RF booster provides variable linearity depending upon the received input signal level. It is expected that the wireless communications system includes an antenna for receiving RF signals and a receiver device having an amplifier for providing a predetermined amount of gain to the received RF signals and converting the RF signals to audio frequency signals, the RF Booster for implementation in the wireless communication system is provided intermediate the antenna and receiver devices.

The low noise amplifier includes a first amplifier device for receiving input signals from an antenna via a first cable connecting device, and provides a first gain equal to the predetermined amount of gain of the receiver device; a second amplifier device connected in series with the first amplifier device, the second amplifier device connected via a second cable connecting device to the receiver device and providing a second amount of gain of a value sufficient to compensate for signal loss provided by the first and second cable means; and a switch element capable of switching out the first gain of the first amplifier device, the switch element controlled by a control signal in accordance with a sensed level of received input RF signals, wherein for small input RF signals received, the switch element is switched off to provide both the first and second gain in the RF booster, and for large input signals received, the switch element is switched on to provide only the second gain for the RF booster.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

DETAILED DESCRIPTION OF THE INVENTION

The inventive system is a low noise amplifier design for implementation in an RF Booster stage that is intended to enable Class I operation of wireless communication systems normally operating as Class II systems, e.g., Personal Stations, in both transmitting and receiving modes. The provision of the inventive low noise amplifier system in the RF Booster stage obviates the need for low noise amplifiers at the receiver end of the Personal Station while compensating for the effects of connection cable losses, e.g., coax. The benefits include Class I operation, greater linearity and sensitivity, which consequently results in increased signal range and ease of user operation.

Figure 1:
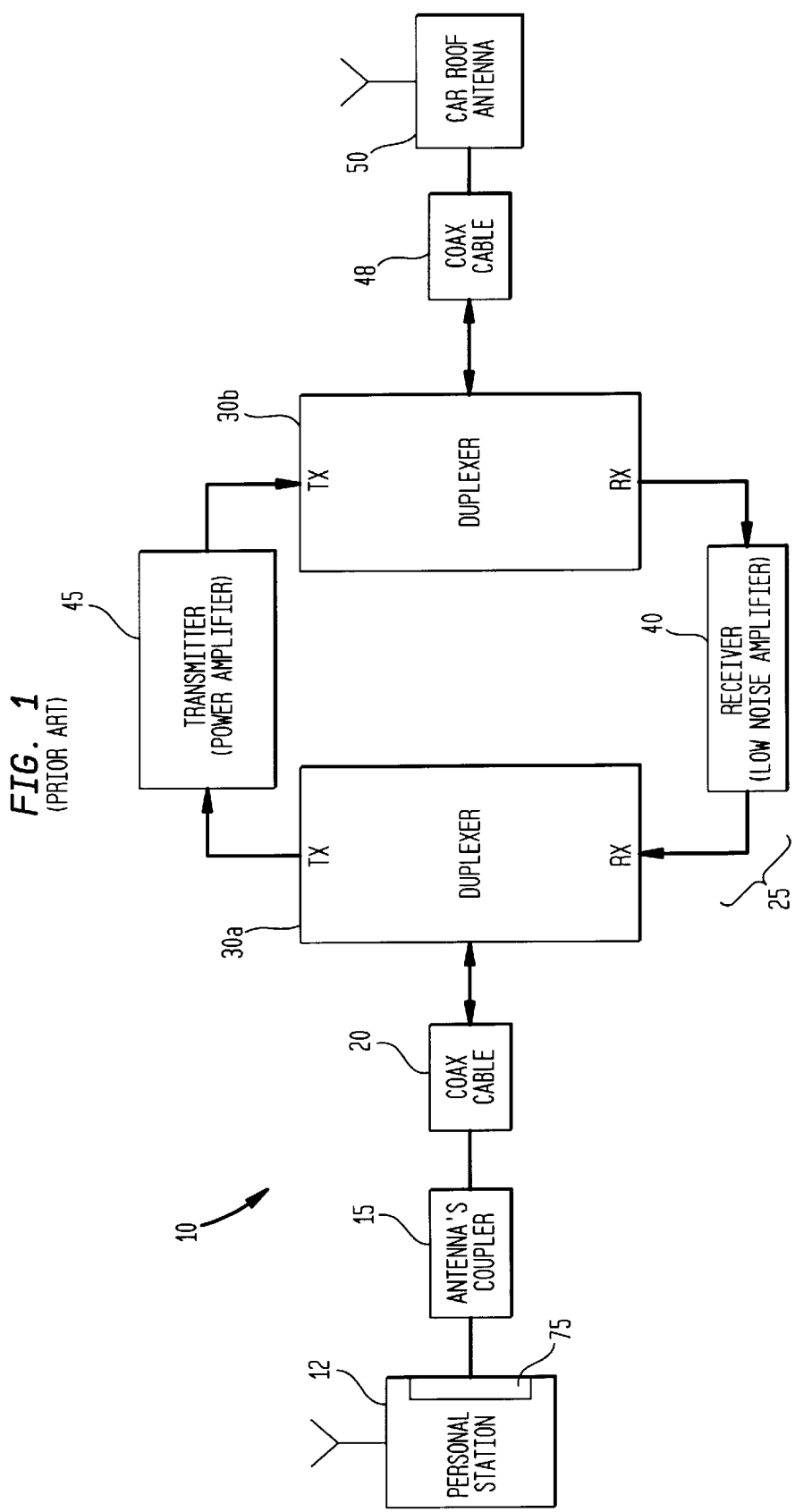
FIG. 1 is a block diagram of a combination: Personal Station/Booster Station placed to the holder of a hands-free kit and connected to an RF Booster by coaxial cables.
Figure 2:
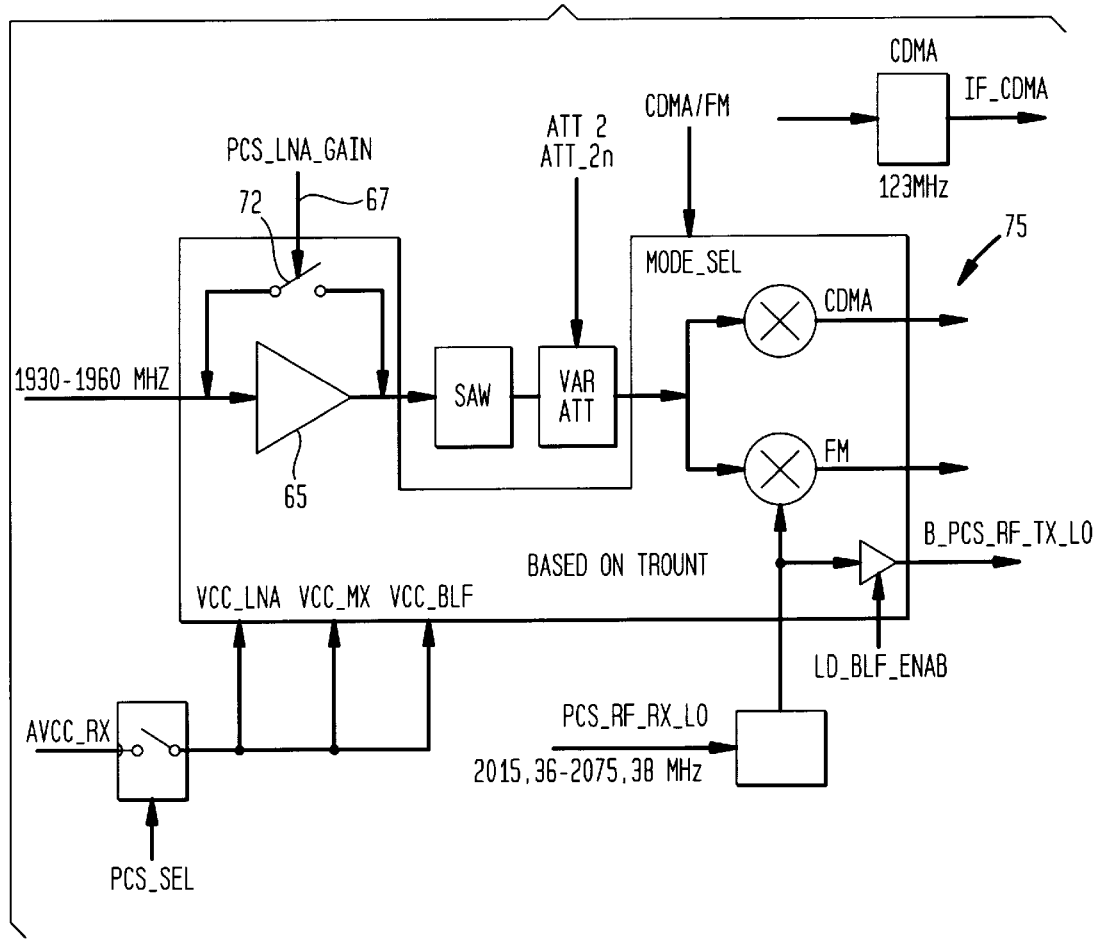
FIG. 2 is a diagram illustrating a typical receiver end of the Personal Station.
Figure 3:
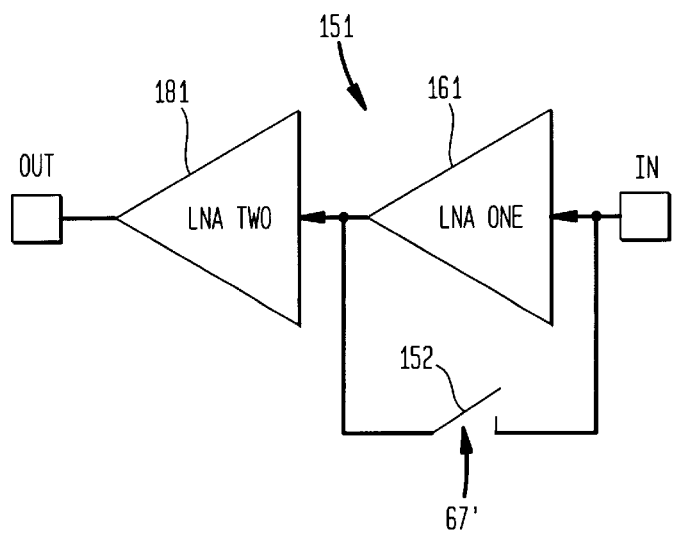
FIG. 3 is a diagram illustrating the low noise amplifier configuration for the receive end of the RF booster.

In the invention, the low noise amplifier 65 provided in the receiver (FIG. 2) is eliminated altogether, i.e., switched off, and is substituted by a low noise amplifier that is provided in the RF booster with higher power handling capability. The implementation of the low noise amplifier 151 for the RF Booster is illustrated in FIG. 3, which shows a first low noise amplifier 161 that receives input signals from the vehicle antenna 50 (See FIG. 1) and duplexer 30b, and that is connected in series with a second low noise amplifier 181 providing gain sufficient to compensate for cable loss. The first low noise amplifier 161 additionally can be switched out of circuit by the provision of switch 152 connected in parallel to the first low noise amplifier 161. It is understood that, with minimal hardware and software additions to/from the receiver, a control signal 67' can be used to control switch 152 in the manner as control signal 67 was used to control the low noise amplifier 65 of the receiver (FIG. 2).

The gain value of a permanently switched off receiver's low noise amplifier is going to be transferred to the RF Booster's low noise amplifier 161 with the power handling capability of the Booster's low noise amplifier set to meet interference requirements for Class I Personal Stations. Thus, the gain of the RF Booster's first amplifier 161 may be set anywhere in the range of from about 13–18 dB, i.e., as close as possible to the maximum gain allowed in Class I systems. The gain value of the first low noise amplifier is going to be switched ON and OFF, in accordance with the same criteria, i.e., power levels of input signals, used to switch ON and OFF the gain of the receiver's low noise amplifier. Thus, as controlled by control signal 67', switching OFF of the second booster's low noise amplifier will protect the receiver front end from overloading by the large input signals and, switching it back ON (when the input signals are small) will significantly improve the overall Noise Figure since this additional gain is placed in front of a noisy cable 20 connecting the RF Booster 25 to receiver 75. Preferably, the loss provided by the switch should be limited to not more than 0.5 dB and as much isolation should be provided, e.g., 15 dB. The second amplifier 181 is to have a gain set at a value required to compensate for the loss in the RF Booster's connecting cables, and may range anywhere from 12–15 dB, e.g., 13.5 dB.

It should be understood that, if a Personal Station is provided with a low noise amplifier having gain that is not switched, then, the gain level provided by the receiver's low noise amplifier must be tweaked to provide the minimum gain possible. Short of redesigning the receiver front end, this can be done by any conventional means, such as, bringing down the voltage level at the input to the amplifier. Consequently, the voltage gain of the first low noise amplifier 161 of the RF Booster is accordingly set to achieve the 13–18 dB for Class I operation.

When small input signals are received at the input of the RF booster 151, the noise figure of the Low Noise Amplifier is low, the gain is high and the linearity is low. When larger signals are received, the gain is switched low, and the linearity is high. Thus, a variable gain, variable linearity Low Noise Amplifier is achieved capable of rendering Class II communications equipment into a Class I operating device.

In view of the foregoing, it is readily seen that the total low power amplification provided by the RF Booster 151 is going to be a sum of two values: a first gain value being transferred from the gain value of the receiver's low noise amplifier 65 and a second gain value required to compensate for the loss in the Booster's connecting cables. The configuration of the low noise amplifier 151 will noticeably allow the achievement of Class I linearity requirements while exceeding the required values for sensitivity.

The foregoing merely illustrates the principles of the present invention. Those skilled in the art will be able to devise various modifications, which although not explicitly described or shown herein, embody the principles of the invention and are thus within its spirit and scope.

What is claimed is:

1. A low noise amplifier for implementation in an RF booster provided in a wireless communication system including an antenna means for receiving RF signals and a receiver device having amplifier means for providing a predetermined amount of gain to said received RF signals and converting said RF signals to audio frequency signals, said RF Booster provided intermediate said antenna means and said receiver device, said low noise amplifier comprising:

a first amplifier device for receiving input signals from said antenna via a first cable connecting means, said first amplifier device capable of providing a first gain equal to or greater than said predetermined amount of gain provided by said receiver device;

a second amplifier device connected in series with said first amplifier device, said second amplifier device connected via a second cable connecting means to said receiver device, said second amplifier device providing a second amount of gain of a value sufficient to compensate for signal loss provided by said first and second cable means; and switching means for switching out said first gain of said first amplifier device, said switching means controlled by a control signal in accordance with a sensed level of received input RF signals, wherein for small input RF signals received, said switching means is switched off to provide both said first and second gain in said RF booster, and for large input signals received, said switching means is switched on to provide only said second gain for said RF booster.

2. A low noise amplifier as claimed in claim 1, wherein said receiver device includes means capable of switching said predetermined amount of receiver gain to unity, said first gain having a value ranging from 13–18 dB when said predetermined amount of receiver gain is set to unity.

3. A low noise amplifier as claimed in claim 2, wherein said second gain has a value ranging from 12–15 dB.

4. A low noise amplifier as claimed in claim 1, wherein said first and second amplifier devices are low noise amplifier devices.

5. A low noise amplifier as claimed in claim 1, wherein said predetermined amount of receiver gain is set to a predetermined level greater than unity, said first gain value chosen to provide in sum with said predetermined receiver gain level, a value not exceeding 18 dB.

6. A low noise amplifier as claimed in claim 5, wherein said second gain has a value ranging from 12–15 dB.

7. An RF booster in a wireless communication system having an antenna means for receiving RF signals, a first cable connecting means connecting said antenna means to said RF booster, a receiver device having amplifier means for providing a predetermined amount of gain to signals input to said receiver device and converting said signals input to said receiver device to audio frequency signals, a second cable connecting means connecting said receiver device to said RF booster, a transmitter device for converting audio signals into output RF signals for output by said antenna means, said RF booster comprising:

a) first means for amplifying said output RF signals;

b) second means for providing a variable gain and variable linearity to said received RF signals to provide amplified received RF signals having low noise characteristic, wherein said second means includes:

a first amplifier device for receiving said received RF signals from said antenna means via said first cable connecting means, said first amplifier device capable of providing a first gain equal to or greater than said predetermined amount of gain provided by said receiver device;

a second amplifier device connected in series with said first amplifier device, said second amplifier device connected via said second cable connecting means to said receiver device, said second amplifier device providing a second amount of gain of a value sufficient to compensate for signal loss provided by said first and second cable connecting means;

switching means for switching out said first gain of said first amplifier device, said switching means controlled by a control signal in accordance with a sensed level of said signals input to said receiver device, wherein for small said signals input to said receiver device, said switching means is switched off to provide both said first and second gain in said RF booster, and for large said signals input to said receiver device, said switching means is switched on to provide only said second gain for said RF booster; and c) means for communicating said amplified output RF signals to said antenna means and for communicating said amplified received RF signals having low noise characteristic to said receiver device.

* * * * *